United States Patent [19]
Chouings

[11] 3,825,034
[45] July 23, 1974

[54] ACCUMULATORS

[75] Inventor: Leslie Cyril Chouings, Leamington Spa, England

[73] Assignee: Automotive Products Company Limited, Leamington Spa, England

[22] Filed: Oct. 13, 1971

[21] Appl. No.: 188,852

[30] Foreign Application Priority Data
Oct. 16, 1970  Great Britain .................... 49290/70

[52] U.S. Cl. ............................................... 138/30
[51] Int. Cl. ............................................ F16l 55/04
[58] Field of Search ........... 138/30; 222/386.5, 389; 292/256, 256.6; 220/55 AN; 285/305

[56] References Cited
UNITED STATES PATENTS

| | | | |
|---|---|---|---|
| 2,273,186 | 2/1942 | Fischer | 292/256.6 |
| 2,342,186 | 2/1944 | Fischer | 292/256.6 |
| 2,343,320 | 3/1944 | Parker | 138/30 |
| 2,436,407 | 2/1948 | Stephens | 292/256.6 |
| 2,638,932 | 5/1953 | Alexander | 138/30 |
| 2,645,513 | 7/1953 | Sterrett | 292/256.6 |
| 2,773,511 | 12/1956 | Mercier | 138/30 |
| 3,692,334 | 9/1972 | Doyle et al. | 285/305 X |

*Primary Examiner*—Houston S. Bell, Jr.
*Assistant Examiner*—Frederick R. Schmidt

[57] ABSTRACT

An accumulator for a liquid pressure system has a hollow casing comprising two hollow casing parts having mating cylindrical surfaces. There is an annular groove in each cylindrical surface, the two grooves being aligned to define an annular cavity in which is-/are housed one or more inserts. The insert(s) act to hold the two hollow casing parts together. The hollow casing is assembled by inserting one of the mating cylindrical surfaces within the other to define the annular cavity, and inserting the one or more inserts through a hole in the wall portion of the outer mating casing part into the annular cavity. An annular cover maybe placed over the wall portion of the outer mating casing part when the two casing parts are assembled together, so as to cover the radially outer end of the hole.

3 Claims, 4 Drawing Figures

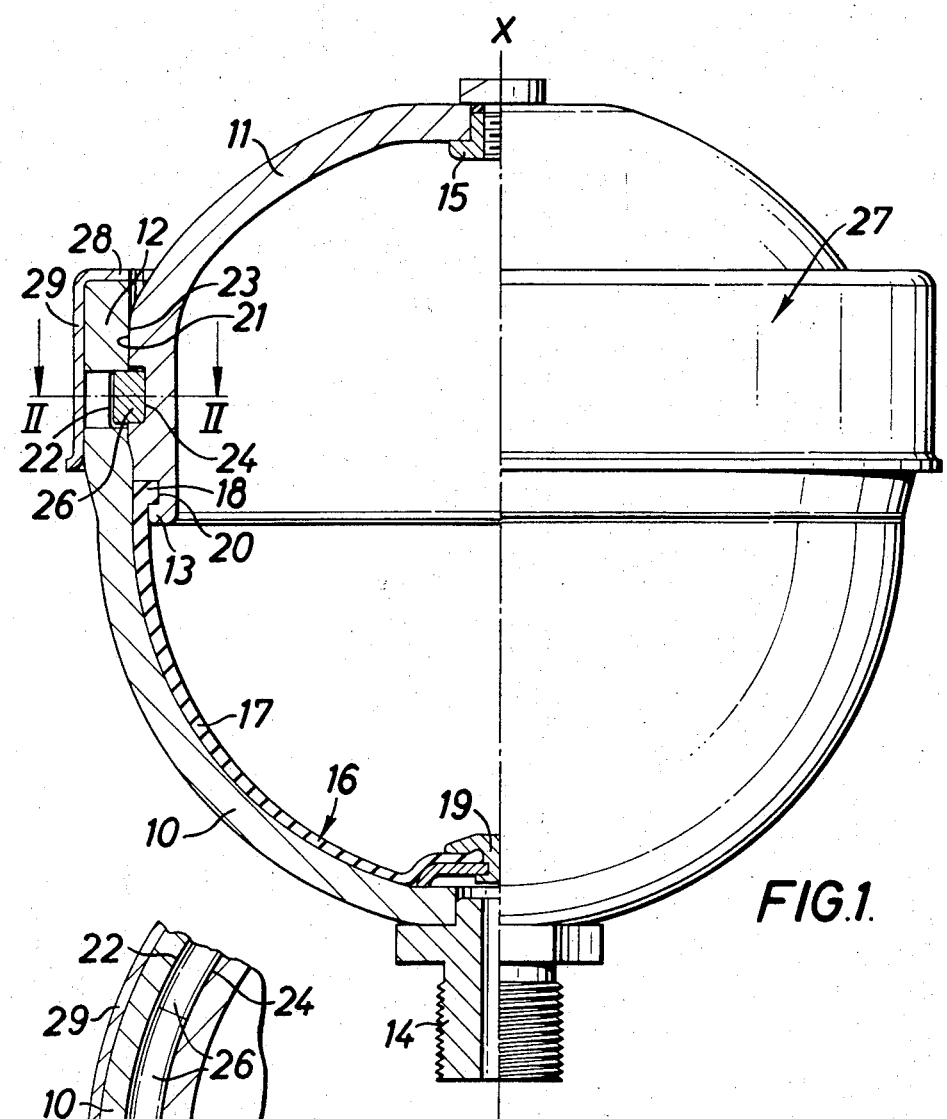
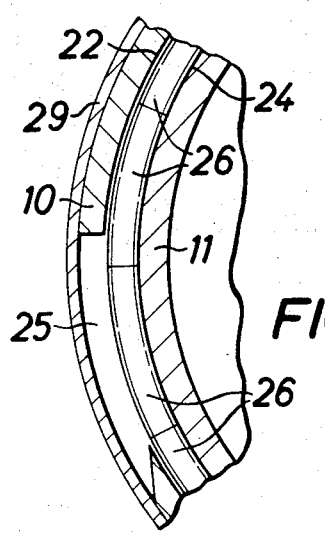
FIG.1.
FIG.2.

ACCUMULATORS

This invention relates to accumulators for use in liquid pressure systems, the accumulators being of the kind comprising a hollow casing formed of two parts secured together, and a diaphragm of flexible material having its peripheral portion trapped between the two casing parts so as to provide a seal against the flow of fluid therebetween, the diaphragm preventing communication between a port formed in one of the casing parts and a port formed in the other casing part. In use of an accumulator of the kind described, the port in said one casing part is connected into the liquid pressure system and fluid under pressure, usually compressed air, is fed through the port in said other casing part into the space defined by said other casing part and the diaphragm of flexible material so that pressure is exerted upon liquid in the hollow casing on the opposite side of the diaphragm of flexible material. This invention relates also to a method of assembling an accumulator of the kind described.

Hitherto the two casing parts have been secured together by screw threaded lock rings or by being welded together.

It is an object of this invention to provide a new and improved method of securing together two casing parts of an accumulator of the kind described.

According to one aspect of this invention there is provided an accumulator of the kind described wherein a first of the two casing parts has an inner annular surface with an annular groove therein and a hole extending through the wall of said first annular casing part, the hole opening into the groove, and a second of the two casing parts has an outer annular surface with an annular groove therein, the two annular surfaces being in face to face abutment so that the two annular grooves together define an annular cavity of substantially uniform cross-section, and including one or more inserts having a cross-section of similar size and shape to that of the annular cavity, the insert or inserts being located within the annular cavity so as to hold the two casing parts together.

Preferably the accumulator includes an annular cover member having a radially inwardly projecting flange, the annular cover member being located on said first casing part with its flange engaged upon the edge of the first casing part remote from the port defined in the first casing part and with its axially extending portion covering the radially outer end of said hole. Conveniently said hole extends tangentially of the annular cavity. The two annular surfaces may be cylindrical.

Where there are a plurality of inserts, the inserts may be in end to end abutment. Alternatively the annular cavity may be filled substantially by a single circumferentially-extending continuous insert.

According to another aspect of this invention there is provided a method of assembling an accumulator of the kind described including forming a first of the casing parts with an inner annular surface, an annular groove in said inner annular surface and a hole through the wall of said first casing part so that the hole opens into the annular groove; forming the second casing part with an outer annular surface and an annular groove in said outer annular surface, the dimensions of the outer annular surface being such that the end of said second casing part remote from the port therein can be inserted into the aperture defined by the end of said first casing part remote from the port therein to form said hollow casing with the two annular grooves aligned one with the other to define an annular cavity of substantially uniform cross-section; inserting said end of said second casing part into the aperture defined by said end of said first casing part; and inserting through said hole into the annular cavity so formed one or more inserts having a cross-section of similar size and shape to that of the annular cavity so that the two casing parts are held secured together by the one or more inserts.

Preferably the method includes also the step of locating an annular cover member on the outer surface of said first casing part to cover the radially outer end of said hole when the two casing parts have been secured together.

Two forms of accumulator in accordance with this invention will be described now by way of example only with reference to the accompanying drawings, of which:

FIG. 1 is a partially sectioned elevation of one form of liquid pressure accumulator according to this invention;

FIG. 2 is a section on the line II—II of FIG. 1;

Figure 3:
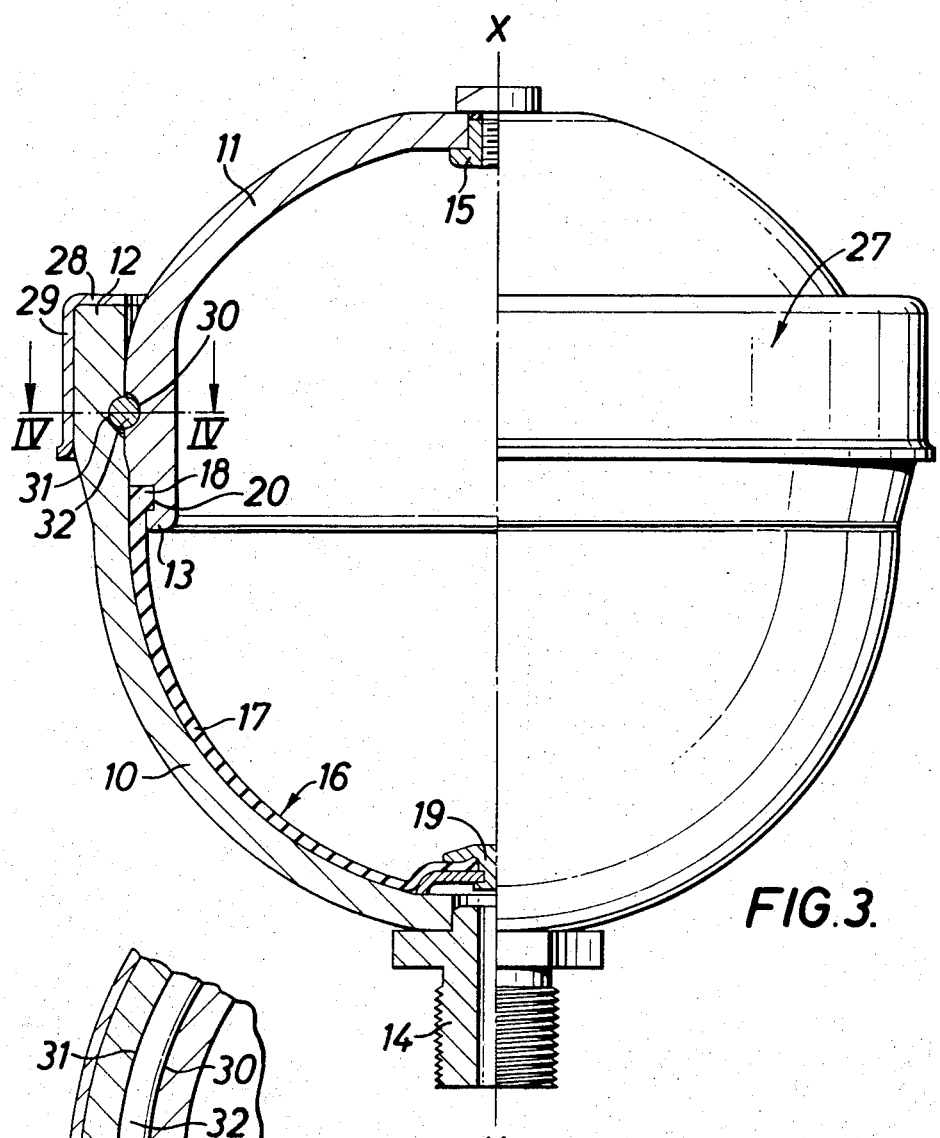
FIG. 3 is a partly sectioned elevation of another form of liquid pressure accumulator according to this invention.

Referring to FIGS. 1 and 2, the accumulator, which is symmetrical about the centre line XX, comprises two cup-shaped casing parts 10 and 11 secured together near to their brims 12 and 13, the brim 13 of the casing part 11 being inserted into the aperture defined by the brim 12 of the casing part 10. The casing part 10 has the usual coupling device 14 by which the accumulator is arranged to be connected into a liquid pressure system. The casing part 11 has the usual connector 15 for connection to a source of compressed air.

A diaphragm 16 comprising an annular component 17 of flexible material with a thickened outer peripheral portion 18, and a central member 19 of rigid material connected to close the aperture defined by the radially inner edge of the annular component 17, is retained between the two parts 10 and 11 in a fluid tight manner with the thickened portion 18 engaged within an annular groove 20 formed in the radially outer surface of the casing part 11 near to the rim 13 thereof.

The radially inner surface portion 21 of the casing part 10 between the thickened end portion 18 of the diaphragm 16 and the rim 12 is cylindrical and has an annular groove 22 of rectangular cross-section defined therein. A cylindrical surface 23 formed on the radially outer surface of the casing member 11 on the side of the groove 20 remote from the rim 13 abuts the cylindrical surface 21 face to face and has defined therein an annular groove 24 of rectangular cross-section which is aligned with the annular groove 22 to define therewith an annular cavity of rectangular cross-section.

FIG. 2 shows that a hole 25 is formed in the outer casing part 10 so as to open into the annular cavity and to extend tangentially thereto. A number of inserts 26 of substantially the same cross-section and size as the rectangular cross-section of the annular cavity are located in end to end abutment within the annular cavity so as to hold the two casing parts 10 and 11 together.

An annular cover 27 having a radially inwardly extending flange 28 and an axially extending annular portion 29 is located on the casing part 10 with the flange 28 in engagement with the radial surface of the brim 12 and with the axially extending portion 29 extending over the radially outer end of the hole 25.

The accumulator illustrated in FIGS. 1 and 2 may be assembled in the following manner. Firstly the thickened outer peripheral portion 18 of the diaphragm 16 is engaged in the annular groove 20. The assembly of the casing part 11 and the diaphragm 16 then is inserted with the aperture defined by the brim 12 of the casing part 10 until the annular grooves 22 and 24 are aligned axially and the thickened outer peripheral portion 18 of the diaphragm 16 is trapped between the casing parts 10 and 11. The inserts 26 are inserted one by one through the hole 25 into the annular cavity defined by the aligned annular grooves 22 and 24. The annular cover 27 then is located in position.

Figure 4:
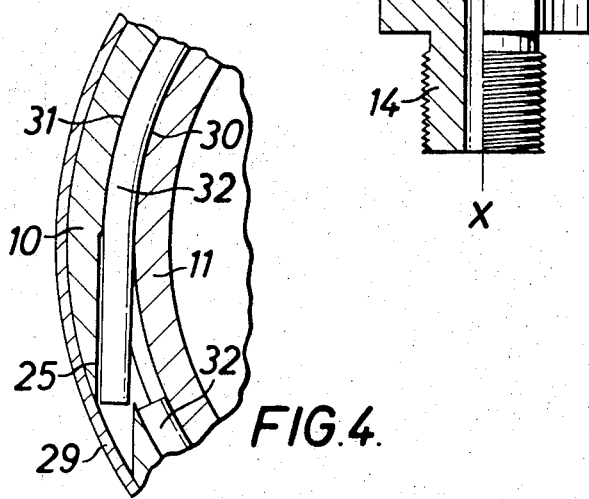
FIG. 4 is a fragmentary section on the line IV—IV of FIG. 3.

The accumulator illustrated in FIGS. 3 and 4 is similar to that described above with reference to FIGS. 1 and 2 excepting that the annular cavity is defined by two co-operating annular grooves 30 and 31 of semi-circular cross-section so that the annular cavity is of circular cross-section, and is filled by a single continuous length 32 of wire, or a similar member of circular cross-section.

The accumulator illustrated in FIGS. 3 and 4 may be assembled in a manner similar to that described above for the accumulator illustrated in FIGS. 1 and 2. The difference being that the length of wire is pushed into the annular cavity instead of the plurality of inserts 26.

I claim:

1. A liquid pressure accumulator formed of two parts comprising a first and second hollow casing with a port in each casing, said casings being substantially convex in shape to form a substantially spheroidial configuration with mating surfaces when secured together, one casing having an annular groove formed on its inner mating surface, a second casing having a corresponding mating annular groove on its outer mating surface, in alignment with said one casing groove when they are secured together, a second annular groove in said second casing disposed in its outer surface below its first mentioned annular groove, adjacent its mating surface, a flexible diaphragm having an inwardly extending rim portion disposed between mating surfaces in said second groove to provide a seal between the chambers formed by said two casings, said diaphragm normally being disposed adjacent the inner surface of said one casing, circumferential hole means disposed in said one casing and communicating with said mating grooves, and elongated rectangular insert means adapted to be inserted through said hole means into said mating grooves to secure said casings together.

2. The accumulator of claim 1, wherein there are a plurality of said insert means disposed in end to end abutment.

3. An accumulator of claim 1, wherein the insert means is a single circumferentially extending continuous insert.

* * * * *